(12) United States Patent
Yasuda et al.

(10) Patent No.: US 9,246,599 B2
(45) Date of Patent: *Jan. 26, 2016

(54) COHERENT OPTICAL RECEIVER, APPARATUS AND METHOD FOR DETECTING INTERCHANNEL SKEW IN COHERENT OPTICAL RECEIVER

(71) Applicant: NEC CORPORATION, Tokyo (JP)

(72) Inventors: Wakako Yasuda, Tokyo (JP); Junichi Abe, Tokyo (JP); Kiyoshi Fukuchi, Tokyo (JP)

(73) Assignee: NEC CORPORAITON, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,725

(22) Filed: Nov. 13, 2013

(65) Prior Publication Data

US 2014/0079386 A1    Mar. 20, 2014

Related U.S. Application Data

(63) Continuation of application No. 13/696,516, filed as application No. PCT/JP2011/061601 on May 13, 2011, now Pat. No. 8,634,727.

(30) Foreign Application Priority Data

May 21, 2010   (JP) ................................ 2010-116878

(51) Int. Cl.
*H04B 10/00* (2013.01)
*H04B 10/61* (2013.01)
(Continued)

(52) U.S. Cl.
CPC .......... *H04B 10/616* (2013.01); *H04B 10/6151* (2013.01); *H04J 14/02* (2013.01); *H04J 14/06* (2013.01)

(58) Field of Classification Search
CPC ............. H04B 10/697; H04B 10/6971; H04B 10/6972; H04B 10/616; H04B 10/6151; H04J 14/02; H04J 14/06

USPC .......................... 398/208, 209, 202, 158, 159
See application file for complete search history.

(56) References Cited

U.S. PATENT DOCUMENTS

| 7,693,428 B2 * | 4/2010 | Khurgin et al. ................ 398/192 |
| 7,734,188 B2 * | 6/2010 | Kuwata et al. ................. 398/154 |

(Continued)

FOREIGN PATENT DOCUMENTS

| JP | 2010-28470 A | 2/2010 |
| JP | 2010-193204 A | 9/2010 |
| WO | 2004/054138 A2 | 6/2004 |

OTHER PUBLICATIONS

Michael G. Taylor, "Coherent Detection Method Using DSP for Demodulation of Signal and Subsequent Equalization of Propagation Impairments", IEEE Photonics Technology Letters, Feb. 2004, 674-676, vol. 16, No. 2.

(Continued)

*Primary Examiner* — M. R. Sedighian
(74) *Attorney, Agent, or Firm* — Sughrue Mion, PLLC

(57) ABSTRACT

In a coherent optical receiver, sufficient demodulation becomes impossible and consequently receiving performance deteriorates if an interchannel skew arises, therefore, a coherent optical receiver according to an exemplary aspect of the invention includes a local light source; a 90-degree hybrid circuit; an optoelectronic converter; an analog-to-digital converter; and a digital signal processing unit, wherein the 90-degree hybrid circuit makes multiplexed signal light interfere with local light from the local light source, and outputs a plurality of optical signals separated into a plurality of signal components; the optoelectronic converter detects the optical signals and outputs detected electrical signals; the analog-to-digital converter quantizes the detected electrical signals and outputs quantized signals; and the digital signal processing unit includes a skew compensation unit for compensating a difference in propagation delay between the plurality of signal components, and a demodulation unit for demodulating the quantized signals.

14 Claims, 12 Drawing Sheets

(51) Int. Cl.
*H04J 14/02* (2006.01)
*H04J 14/06* (2006.01)

(56) References Cited

U.S. PATENT DOCUMENTS

| | | |
|---|---|---|
| 7,894,728 B1 | 2/2011 | Sun et al. |
| 8,145,071 B2 * | 3/2012 | Tanaka et al. ............ 398/209 |
| 8,355,637 B2 | 1/2013 | Sano et al. |
| 8,634,727 B2 * | 1/2014 | Yasuda et al. ............ 398/208 |
| 2007/0147850 A1 * | 6/2007 | Savory et al. ............ 398/208 |
| 2010/0119241 A1 * | 5/2010 | Yang et al. ............ 398/208 |
| 2010/0178065 A1 | 7/2010 | Nishihara et al. |
| 2010/0209121 A1 | 8/2010 | Tanimura |
| 2011/0150503 A1 | 6/2011 | Winzer |
| 2011/0229127 A1 | 9/2011 | Sakamoto et al. |

OTHER PUBLICATIONS

Notice of Allowance issued Aug. 21, 2013 in U.S. Appl. No. 13/696,516.
Communication dated May 8, 2015 from the European Patent Office in counterpart application No. 11783646.0.

* cited by examiner

COHERENT OPTICAL RECEIVER, APPARATUS AND METHOD FOR DETECTING INTERCHANNEL SKEW IN COHERENT OPTICAL RECEIVER

CROSS REFERENCE TO RELATED APPLICATIONS

This application is a continuation application of U.S. application Ser. No. 13/696,516 filed Nov. 6, 2012, which claims priority from the National Stage of International Application No. PCT/JP2011/061601 filed May 13, 2011, claiming priority based on Japanese Patent Application No. 2010-116878 filed May 21, 2010, the contents of all of which are incorporated herein by reference in their entirety.

TECHNICAL FIELD

The present invention relates to coherent optical receivers, and apparatuses and methods for detecting interchannel skew in a coherent optical receiver, and, in particular, to a coherent optical receiver which receives polarization multiplexing optical signals by means of coherent detection and digital signal processing, and to an apparatus and a method for detecting interchannel skew in the coherent optical receiver.

BACKGROUND ART

The data capacity in the networks has been increasing year by year due to the wide spread of the Internet. In the trunk line connecting metropolitan areas, the optical transmission link whose transmission capacity per one channel is 10 Gb/s or 40 Gb/s has already been introduced. The On-Off-keying (OOK) is employed as a modulation scheme in 10 Gb/s transmission. Although the OOK scheme is also employed in 40 Gb/s transmission, it is unsuitable for long-haul transmission because the transmission characteristics are greatly influenced by the chromatic dispersion due to the narrow optical pulse width of 25 ps. Therefore, the multilevel modulation scheme using phase modulation and the polarization multiplexing scheme have been adopted, and the Dual Polarization Quadrature Phase Shift Keying (DP-QPSK) scheme is mainly employed for 100 Gb/s class transmission systems.

The optical signals modulated by DP-QPSK scheme in a transmitter are received and demodulated by a coherent optical receiver (refer to Non Patent Literature 1, for example). FIG. 12 shows an example of the configuration of a related coherent optical receiver. The related coherent optical receiver 600 has a local light source 610, a 90-degree hybrid circuit (90° HYBRID) 620, an optoelectronic converter (O/E) 630, an analog-to-digital converter (ADC) 640, and a digital signal processing unit (DSP) 650.

Signal light and local light can be represented by the following formulae as a single polarization signal, respectively.

$$S(t)=\exp[j\omega t] \quad (1)$$

$$L(t)=\exp[j(\omega+\Delta\omega)t] \quad (2)$$

Here, $\Delta\omega$ represents a frequency offset between the signal light and the local light. The signal light and the local light are inputted into the 90-degree hybrid circuit (90° HYBRID) 620, passing through an optical interference system, and converted into electric signals by the optoelectronic converters (O/E) 630, each of which is composed of differentially configured photodiodes. At this time, the outputs represented by the following formulae (3) and (4) are obtained from an $I_X$ port and a $Q_X$ port, respectively.

$$I_X(t)=\cos(\Delta\omega t) \quad (3)$$

$$Q_X(t)=\sin(\Delta\omega t) \quad (4)$$

In the case of a polarization multiplexed signal, the signal light S (t) is expressed as S (t)=$E_X+E_Y$, the cosine components of the mixed signal of $E_X+E_Y$ are outputted from $I_X$ port and $I_Y$ port, and the sine components of the mixed signal of $E_X+E_Y$ are outputted from $Q_X$ port and $Q_Y$ port.

The signals outputted from each port are AD converted by the analog-to-digital converters (ADC) 640, and then inputted into the digital signal processing unit (DSP) 650. The digital signal processing unit (DSP) 650 demultiplexes inputted signals to $E_X$ signal and $E_Y$ signal by polarization demultiplexing processing, and demodulates the signals of $E_X$ and $E_Y$ into four levels by phase estimation processing.

In this way, the DP-QPSK signals can be demodulated by using the coherent optical receiver.

Non Patent Literature 1: M. G. Taylor, "Coherent Detection Method Using DSP for Demodulation of Signal and Subsequent Equalization of Propagation Impairments", IEEE Photonics Technology Letters, vol. 16, No. 2, February 2004, p. 674-676

DISCLOSURE OF INVENTION

Problem to be Solved by the Invention

The expressions of the signals in the above-described formulae (3) and (4) are true only if, in the coherent optical receiver 600, all lengths of four signal lines from the outputs of the 90-degree hybrid circuit 620 to the inputs of the analog-to-digital converter 640 are equal. However, it is difficult to make precisely equal the length between those four channels, that is, the length of optical fiber cables from the output of the 90-degree hybrid circuit 620 to the inputs of the optoelectronic converters 630, and the length of coaxial wires from the outputs of the optoelectronic converters 630 to the inputs of the analog-to-digital converters 640.

Here, if the lengths of the lines are not equal between those four channels, there arises a delay in signal transmission, that is, a skew. The influence of the skew will be described referring to FIG. 13. FIG. 13 is a block diagram showing the configuration of related 90-degree hybrid circuits 620 and their peripherals. In this figure, "PBS" represents a polarization beam splitter, "CPL" represents an optical coupler, "τ" represents a 90-degree phase difference unit, and "BR" represents a balanced photodetector as the optoelectronic converter (O/E) 630, respectively.

If there exists a skew T in the channel 2 (CH2) against the channel 1 (CH1), the above-described formula (4) is changed into the following formula (5).

$$Q_X(t)=\sin(\Delta\omega(t+T)) \quad (5)$$

In the absence of the above-described skew T, the polarization demultiplexing and the phase estimation can be performed by the digital signal processing using the above-described formulae (3) and (4), and demodulation can be achieved perfectly. However, if there exists an interchannel skew, the output signal from the port $Q_X$ expressed by the formula (4) changes into the output signal expressed by the formula (5), and the demodulation becomes imperfect even though the digital signal processing is performed, and thus sufficient performance can not be achieved. As described above, in a coherent optical receiver, there is a problem that sufficient demodulation becomes impossible and consequently receiving performance deteriorates if an interchannel skew arises.

The object of the present invention is to provide a coherent optical receiver and an apparatus and a method for detecting interchannel skew in the coherent optical receiver which solve the problem mentioned above that in a coherent optical receiver, sufficient demodulation becomes impossible and consequently receiving performance deteriorates if an interchannel skew arises.

Means for Solving a Problem

A coherent optical receiver according to an exemplary aspect of the invention includes a local light source; a 90-degree hybrid circuit; an optoelectronic converter; an analog-to-digital converter; and a digital signal processing unit, wherein the 90-degree hybrid circuit makes multiplexed signal light interfere with local light from the local light source, and outputs a plurality of optical signals separated into a plurality of signal components; the optoelectronic converter detects the optical signals and outputs detected electrical signals; the analog-to-digital converter quantizes the detected electrical signals and outputs quantized signals; and the digital signal processing unit includes a skew compensation unit for compensating a difference in propagation delay between the plurality of signal components, and a demodulation unit for demodulating the quantized signals.

An apparatus for detecting interchannel skew in a coherent optical receiver according to an exemplary aspect of the invention includes a coherent optical receiver; a test light source; an analog-to-digital converter; an FFT operation unit; and a control block; wherein the coherent optical receiver includes a local light source, a 90-degree hybrid circuit, and an optoelectronic converter; the 90-degree hybrid circuit makes test light from the test light source interfere with local light from the local light source, and outputs a plurality of optical signals separated into a plurality of signal components; the optoelectronic converter detects the optical signals and outputs detected electrical signals; the analog-to-digital converter quantizes the detected electrical signals and outputs quantized signals; the FFT operation unit performs a fast Fourier transform process on the quantized signals; and the control block calculates a difference in propagation delay between the plurality of signal components from the results of the fast Fourier transform process.

A method for detecting interchannel skew in a coherent optical receiver according to an exemplary aspect of the invention includes the steps of: outputting a plurality of optical signals separated into a plurality of signal components by making test light from a test light source interfere with local light from a local light source; detecting the optical signals and outputting detected electrical signals; quantizing the detected electrical signals and outputting quantized signals; performing a fast Fourier transform process on the quantized signals; and calculating a difference in propagation delay between the plurality of signal components from the results of the fast Fourier transform process.

Effect of the Invention

According to the coherent optical receiver by the present invention, even if a skew arises between the channels, it becomes possible to achieve sufficient demodulation and thus to suppress deterioration of reception performance.

DESCRIPTION OF EMBODIMENTS

The exemplary embodiments of the present invention will be described with reference to drawings below.

[The First Exemplary Embodiment]

Figure 1:
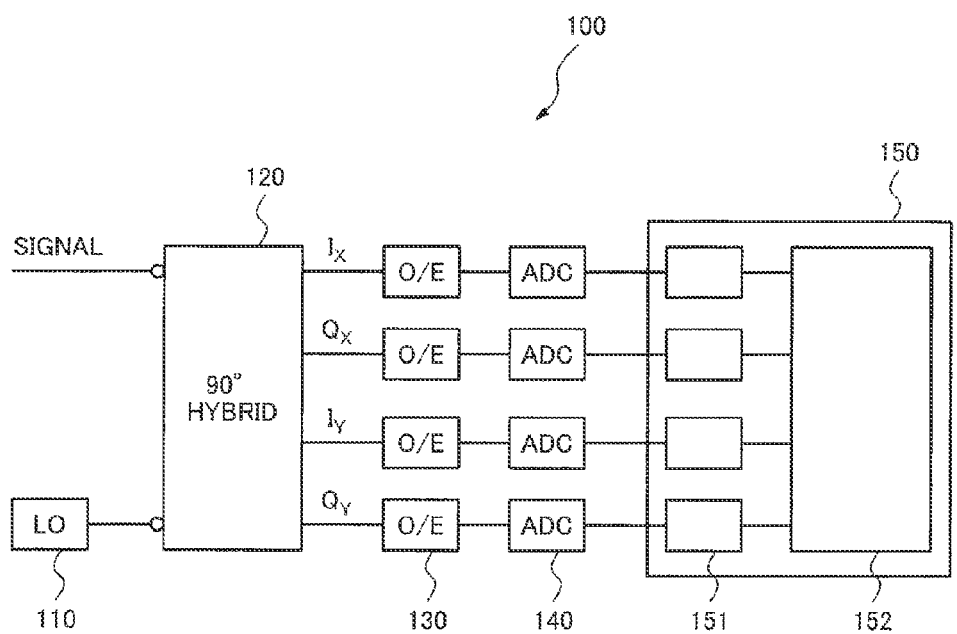
FIG. 1 is a block diagram showing the configuration of a coherent optical receiver in accordance with the first exemplary embodiment of the present invention.

FIG. 1 is a block diagram showing the configuration of a coherent optical receiver 100 in accordance with the first exemplary embodiment of the present invention. The coherent optical receiver 100 has a local light source 110, a 90-degree hybrid circuit (90° HYBRID) 120, optoelectronic converters (O/E) 130, analog-to-digital converters (ADC) 140, and a digital signal processing unit (DSP) 150.

The 90-degree hybrid circuit (90° HYBRID) 120 makes multiplexed signal light (SIGNAL) interfere with the local light from the local light source 110, and outputs a plurality of optical signals separated into respective signal components. In the present exemplary embodiment, the case will be described in which DP-QPSK modulation scheme is used. Accordingly, the 90-degree hybrid circuit (90° HYBRID) 120 outputs four-wave light signals including four-channel signal components respectively which are composed of in-phase components ($I_X$, $I_Y$) and quadrature-phase components ($Q_X$, $Q_Y$) for each of two polarizations (X polarization and Y polarization).

The optoelectronic converter (O/E) 130 detects the respective light signals outputted from the 90-degree hybrid circuit 120, and outputs the detected electrical signals. The analog-to-digital converter (ADC) 140 quantizes the detected electrical signals, and outputs the quantized signals.

The digital signal processing unit (DSP) 150 is provided with a skew compensation unit 151 which compensates the difference in propagation delay between a plurality of signal components (hereinafter, referred to as "skew"), and a demodulation unit 152. The skew compensation unit 151 can be configured by using an FIR (Finite Impulse Response) filter and the like, for example; and in such a case, it holds filter coefficients which are determined on the basis of a skew value. The demodulation unit 152 separates the quantized signals into X polarization signals and Y polarization signals by the polarization demultiplexing process, and then demodulates each of the four-channel signal components by the phase estimation process.

Figure 2:
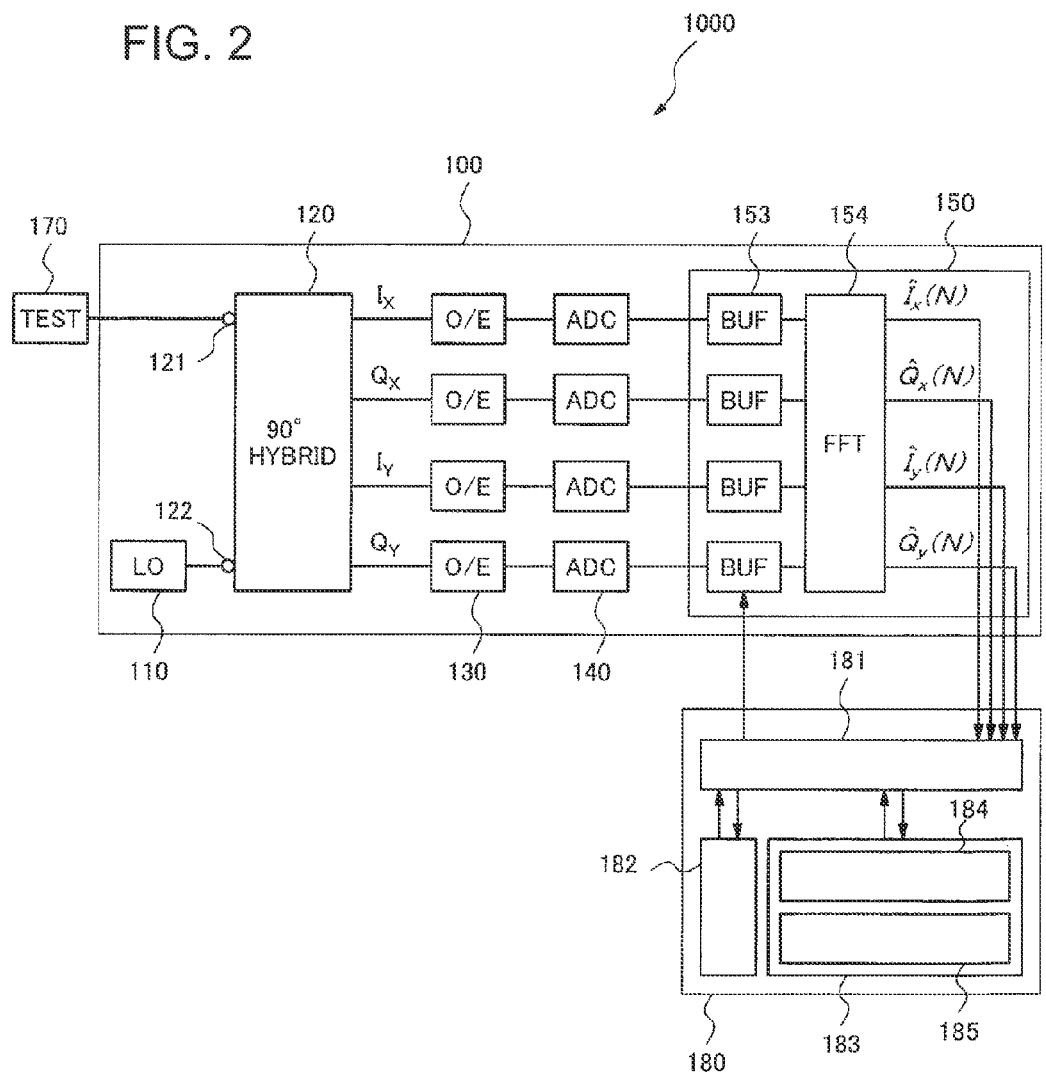
FIG. 2 is a block diagram showing the configuration of an apparatus for detecting interchannel skew in the coherent optical receiver in accordance with the first exemplary embodiment of the present invention.

Next, a method for detecting interchannel skew in the coherent optical receiver 100 will be described, referring to FIG. 2. In the following, the case will be described in which the digital signal processing unit (DSP) 150 in the coherent optical receiver 100 is provided with a buffer unit (BUF) 153 and an FFT operation unit (FFT) 154. Here, the FFT operation unit 154 performs a fast Fourier transform (referred to as "FFT", hereinafter) process on the quantized signals outputted by the analog-to-digital converter 140. In FIG. 2, illustrations of the skew compensation unit 151 and the demodulation unit 152 are omitted.

In the following, first, the case will be described in which there is a 90-degree error between I port and Q port in the 90-degree hybrid circuit. That is, although there is a delay corresponding to the signal cycle of 90 degree between I port and Q port in the 90-degree hybrid circuit, the phase difference does not necessarily correspond to 90 degree exactly due to the variability in the manufacturing process of the 90-degree hybrid circuit. Taking into account a delay $\Delta\tau$ due to the error in the 90-degree phase difference, the formula (5) described above is changed into the following formula (6).

$$Q_X(t) = \sin(\Delta\omega(t+T)+\Delta\tau) \quad (6)$$

When there exists this 90-degree error, the output signal from the port $Q_X$ expressed by the formula (4) changes into the output signal expressed by the formula (6), and also in this case, the demodulation becomes insufficient even though digital signal processing is performed, and thus sufficient performance cannot be achieved.

As shown in FIG. 2, a test light source 170 and a control block 180 are connected to the coherent optical receiver 100, and thereby an apparatus for detecting interchannel skew in the coherent optical receiver 1000 is configured. The control block 180 includes a control unit 181, a memory unit 182, and an operational processing unit 183. The operational processing unit 183 is provided with a peak detection unit 184 and a skew calculation unit 185, and calculates a skew value from FFT processed results. Here, the peak detection unit 184 and the skew calculation unit 185 can be configured by specific signal processing circuits, and may also be configured by a central processing unit (CPU) and programs for enabling the CPU to execute a process.

The test light source (TEST) 170 is connected to a signal port 121 of the 90-degree hybrid circuit (90° HYBRID) 120, and the local light source 110 is connected to a local port 122. Light components outputted from the $I_X$, $Q_X$, $I_Y$, and $Q_Y$ ports, which are output ports of the 90-degree hybrid circuit (90° HYBRID) 120, are inputted into the optoelectronic converters (O/E) 130, respectively.

In detecting interchannel skew in the coherent optical receiver 100, first, a continuous wave (CW) light as a test light with a frequency $f_S$ (its wavelength is equal to $\lambda_S$) is inputted from the test light source 170 into the signal port 121. Here, a wavelength tunable light source can be used for the test light source 170. On the other hand, a CW light as a local light of a frequency $f_O$ (its wavelength is equal to $\lambda_O$) is inputted from the local light source 110 into the local port 122. The test light of frequency fs and the local light of frequency $f_O$ interfere in the 90-degree hybrid circuit 120, and beat signals of a frequency $f_{IF}=|f_S-f_O|$ are outputted. Here, the beat signals outputted from the $I_X$, $Q_X$, $I_Y$, and $Q_Y$ ports are represented by the following formulae form (7) to (10), respectively.

$$I_X = \cos(2\pi f_{IF} t + \phi_{IX}) \quad (7)$$

$$Q_X = \sin(2\pi f_{IF} t + \phi_{QX}) \quad (8)$$

$$I_Y = \cos(2\pi f_{IF} t + \phi_{IY}) \quad (9)$$

$$Q_Y = \sin(2\pi f_{IF} t + \phi_{QY}) \quad (10)$$

These beat signals are converted into electrical signals by the optoelectronic converters (O/E) 130, quantized by the analog-to-digital converters (ADC) 140, and then inputted into the digital signal processing unit (DSP) 150, respectively. In the digital signal processing unit (DSP) 150, the signals are divided into blocks with respect to each predetermined processing unit (4096 bits, for example) by buffer units 153, and subjected to an FFT process in the FFT operation unit (FFT) 154. As a result, each of matrices $\hat{I}_x(N)$, $\hat{Q}_x(N)$, $\hat{I}_y(N)$, and $\hat{Q}_y(N)$ is obtained as each output of the FFT operation unit 154. Here, "N" represents a point number of FFT and it is equal to a value from 0 to 4095, for example.

Next, the method for detecting interchannel skew in the coherent optical receiver in accordance with the present exemplary embodiment will be described referring to the flowchart shown in FIG. 3. First, the frequency of the test light source 170 is set at a frequency $f_{S1}$ (its wavelength is equal to $\lambda_{S1}$) (step S1). Accordingly, a beat signal of a frequency $f_{IF}=|f_{S1}-f_O|$ is outputted from each output port of the 90-degree hybrid circuit (90° HYBRID) 120.

Next, data capturing process is started (step S2). At that time, the control unit 181 in the control block 180 transmits a data capture signal to the digital signal processing unit (DSP) (step S3). The FFT operation unit 154 receives the data capture signal, triggered by the signal, it performs an FFT process on the data stored in the buffer unit (BUF) 153 at that time (step S4), and returns FFT data $\hat{I}_x(N)$, $\hat{Q}_x(N)$, $\hat{I}_y(N)$, and $\hat{Q}_y(N)$ to the control unit 181. The control unit 181 stores the acquired FFT data in the memory unit 182 (step S5).

Figure 4:
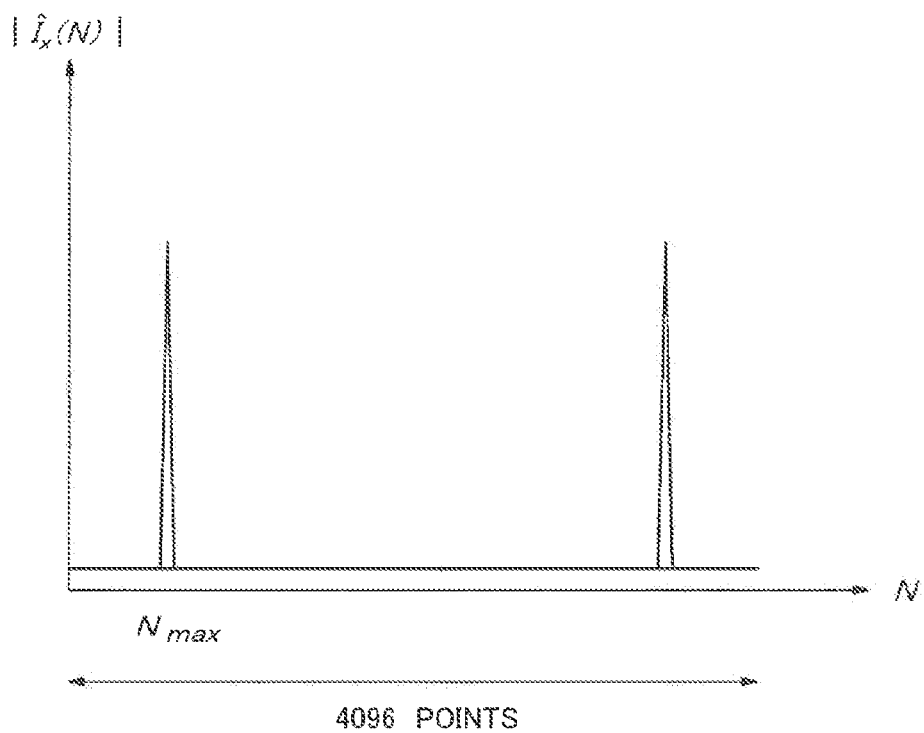
FIG. 4 is a diagrammatic illustration where FFT data are plotted against point number, which are derived by an FFT operation unit in the coherent optical receiver in accordance with the first exemplary embodiment of the present invention.

By an instruction from the control unit 181, the peak detection unit 184 in the operational processing unit 183 extracts the data $\hat{I}_x(N_{max})$ having the maximum magnitude from 4096 points of the FFT data $\hat{I}_x(N)$. The frequency (peak frequency) $f_{max}$ and the phase (peak phase) $\phi_{max}$ at that point are derived by calculation (step 6). In FIG. 4, a diagrammatic illustration is shown where $\hat{I}_x(N)$ are plotted against point number N. Here, since the FFT data $\hat{I}_x(N)$ are composed of complex numbers, the vertical axis of the figure represents the magnitude of $\hat{I}_x(N)$, $|\hat{I}_x(N)|$, and the horizontal axis represents the point number N in the FFT data. As shown in FIG. 4, if $|\hat{I}_x(N)|$ has a peak value at the point number $N_{max}$, the peak detection unit 184 detects the $\hat{I}_x(N_{max})$. Here, $f_T$ representing a sampling frequency in the analog-to-digital converters (ADC) 140, a frequency interval of the FFT process is equal to $f_T/4096$. Therefore, the peak frequency $f_{max}$ at the peak of $I\hat{}_x(N)$ is equal to $N_{max} f_T f/4096$. And then, peak phase information $\phi_{max}=\angle(I\hat{}_x(N_{max}))$ is calculated by using the FFT data $I\hat{}_x(N_{max})$ at the peak frequency $f_{max}$.

In this way, the peak detection unit 184 derives the peak frequency $f_{max}$ and the peak phase $\phi_{max}$ at the peak of the magnitude of the FFT data $I\hat{}_x(N)$, and the control unit 181 stores them in the memory unit 182 as a frequency $f_{IX(1,1)}$ and a phase $\phi_{IX(1,1)}$ (step S7). At that time, the other data of the FFT data $I\hat{}_x(N)$ can be eliminated.

In order to reduce the influence of a measurement error, the processes from step 3 to step 7 are repeated n times, and frequencies $f_{IX(1,n)}$ and phases $\phi_{IX(1,n)}$ are stored in the memory unit 182, respectively (feedback loop FB1). When the n-th loop has been completed, an ending flag is set (step 8).

Next, after changing the frequency of the test light source 170 into a frequency $f_{S2}$ (step S9), the processes from step 2 to step 7 are repeated again, and then frequencies $f_{IX(2,n)}$ and phases $\phi_{IX(2,n)}$ are stored in the memory unit 182 (step S7). When detecting the ending flag (step S8), the frequency of the test light source 170 is further swept (step S9), and then the processes from step 2 to step 8 are repeated again (feedback loop FB2). By repeating the feedback loop FB2 m times, frequencies $f_{IX(m,n)}$ and phases $\phi_{IX(m,n)}$ are stored in the memory unit 182, respectively. By performing similar processes for $Q\hat{}_x(N)$, $I\hat{}_y(N)$, and $Q\hat{}_y(N)$, frequencies $f_{QX(m,n)}$, $f_{IY(m,n)}$, and $f_{QU(m,n)}$, and phases $\phi_{QX(m,n)}$, $\phi_{IY(m,n)}$, and $\phi_{QY(m,n)}$ are stored in the memory unit 182, respectively.

When the above-mentioned processes have been completed, by an instruction from the control unit 181, the skew calculation unit 185 in the operational processing unit 183 calculates skews (step 10). For example, using the $I_X$ port as a reference, a skew in the $I_X$ port becomes zero, and a skew in each of the ports $Q_X$, $I_Y$, and $Q_Y$ is represented by phase lead or phase lag against the $I_X$ port. Specifically, first, the phase differences in the respective ports are obtained for a measurement cycle number n and a measurement frequency m by calculating the following quantities, respectively.

$$\phi_{IX(m,n)}=0$$

$$\phi_{QX(m,n)}-\phi_{IX(m,n)}$$

$$\phi_{IY(m,n)}-\phi_{IX(m,n)}$$

$$\phi_{QY(m,n)}-\phi_{IX(m,n)}$$

Figure 5:
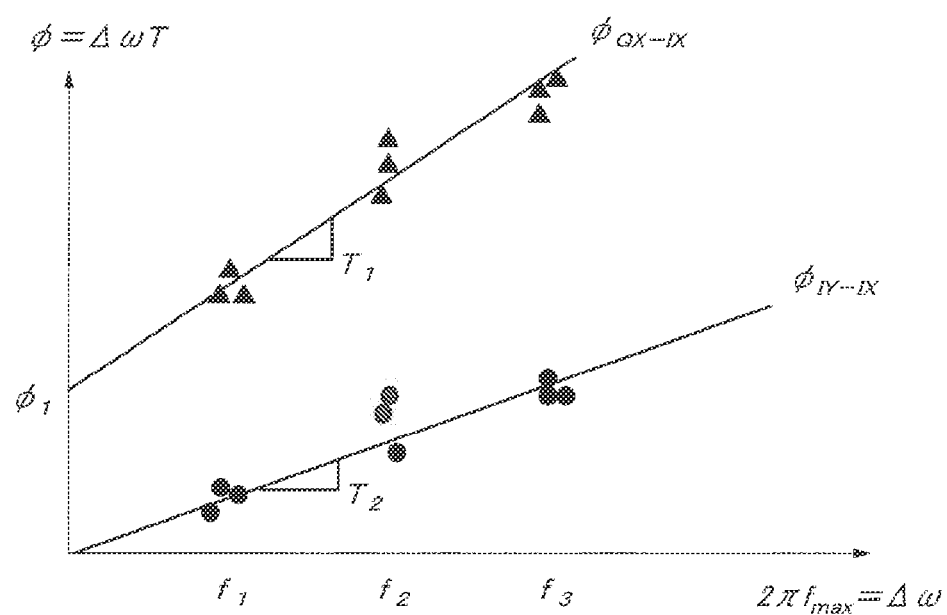
FIG. 5 is a diagrammatic illustration plotting the relations between phase difference and angular frequency at $Q_X$ port and $I_Y$ port of the coherent optical receiver in accordance with the first exemplary embodiment of the present invention.

FIG. 5 shows a diagrammatic illustration plotting the relations between each phase difference of $\phi_{QX-IX}$ and $\phi_{IY-IX}$ in the $Q_X$ port and $I_Y$ port using the $I_X$ port as a reference and the angular frequency $2\pi f_{max}$. By using this figure, approximation formulae represented by linear functions are derived for the $Q_X$ port and $I_Y$ port respectively, as follows.

$$\phi_{QX-IX}=T_1(2\pi f)+\phi_1$$

$$\phi_{IY-IX}=T_2(2\pi f)+\phi_2$$

An approximation formula is similarly derived for the $Q_Y$ port as follows.

$$\phi_{QY-IX}=T_3(2\pi f)+\phi_3$$

Each gradient of $T_1$, $T_2$, and $T_3$ obtained here represents a skew against the $I_X$ port. Here, the accuracy in the skew detection is obtained by the relation between the point number N of the FFT process and $f_{rF}$. For example, since a period is equal to 1 ns (=1000 ps) with $f_{IF}$ being equal to 1 GHz, the accuracy of the skew detection becomes equal to 0.24 ps (=1000/4096) when N is equal to 4096. That is, it is found that the detection accuracy deteriorates with $f_{IF}$ decreasing.

On the other hand, a phase difference in the $Q_Y$ port against the $I_Y$ port is represented as follows.

$$\phi_{QY(m,n)}-\phi_{IY(m,n)}$$

Here, the relation to the angular frequency $2\pi f_{max}$ is approximately represented by the following linear function, as is the case mentioned above.

$$\phi_{QY-IY}=T_4(2\pi f)+\phi_4$$

Since each of the phase differences $\phi_{QX-IX}$ and $\phi_{QY-IY}$ is equal to $\pi/2$ without frequency offset, each of $\phi_1$ and $\phi_4$ should become $\pi/2$. Therefore, the 90-degree error between the $I_X$ port and the $Q_X$ port, and that between the $I_Y$ port and the $Q_Y$ port become $\phi_1-\pi/2$ and $\phi_4-\pi/2$, respectively. Accordingly, by deriving $\phi_1$ and $\phi_4$ from the y-intercepts of the linear functions shown in FIG. 5, the 90-degree errors in the $I_Y$ port and the $Q_Y$ port are obtained.

As mentioned above, according to the apparatus and the method for detecting interchannel skew in the coherent optical receiver of this exemplary embodiment, it becomes possible to calculate skews between the output ports and the 90-degree errors between the I port and the Q port. That is to say, it is possible to input test light into the signal port of the 90-degree hybrid circuit, observe beat signals between the test light and the local light by means of analog-to-digital converters, and calculate the skews and the 90-degree errors by using the phase information obtained by performing an FFT operation.

Furthermore, according to the coherent optical receiver 100 of the present exemplary embodiment, by compensating the skew values obtained above in the skew compensation unit 151 of the digital signal processing unit 150, it becomes possible to demodulate sufficiently even though there arises a skew between the channels, and suppress the degradation of receiving performance.

Figure 3:
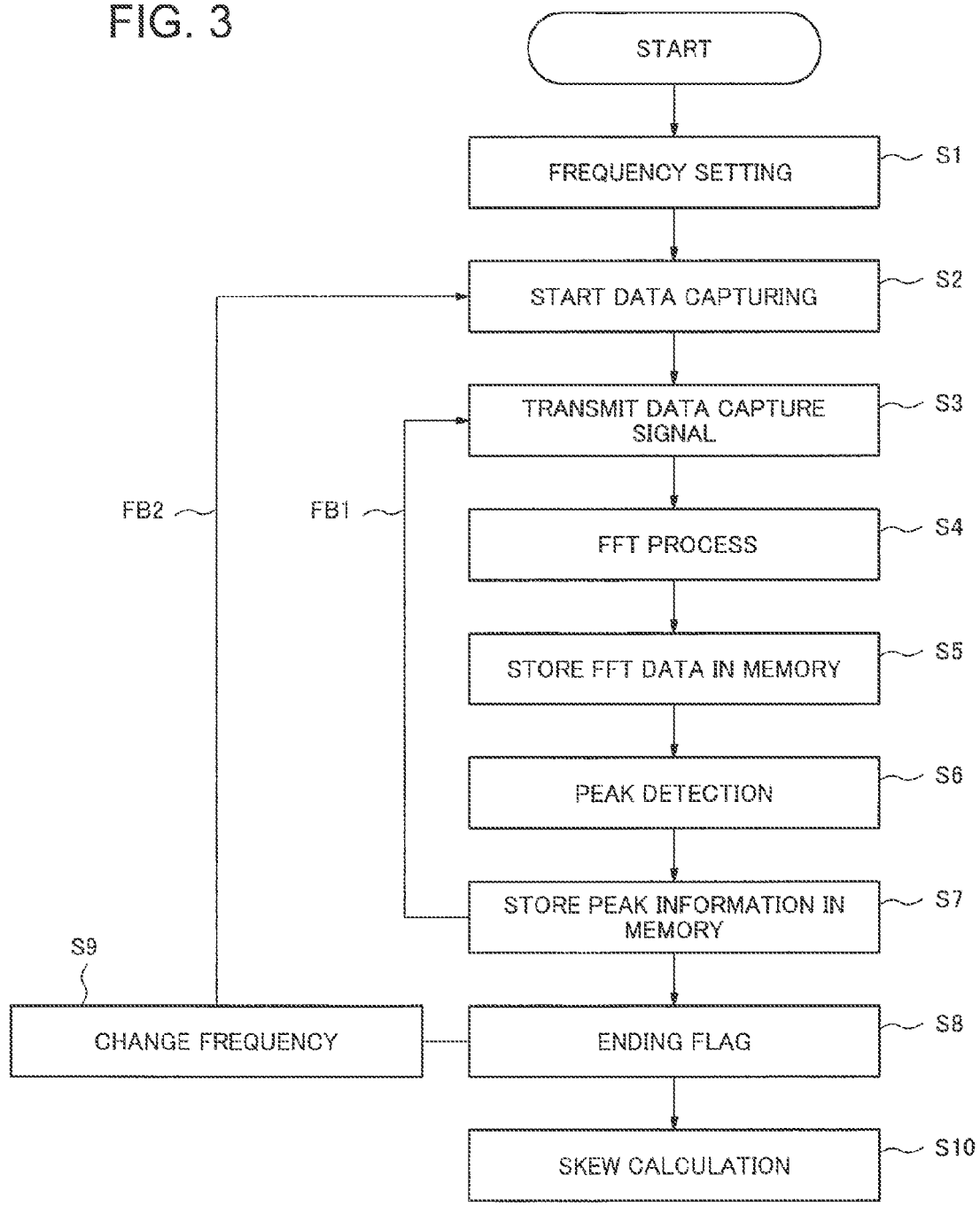
FIG. 3 is a flowchart illustrating a method for detecting interchannel skew in the coherent optical receiver in accordance with the first exemplary embodiment of the present invention.

In the above-mentioned exemplary embodiment, the 90-degree error between I port and Q port is calculated by obtaining the difference in peak phase between the channels at each of the frequencies with sweeping the frequency of the test light source as shown by the feedback loop FB2 in FIG. 3. However, if the 90-degree error can be neglected, it is possible to detect an inter-channel skew more simply.

Figure 6:
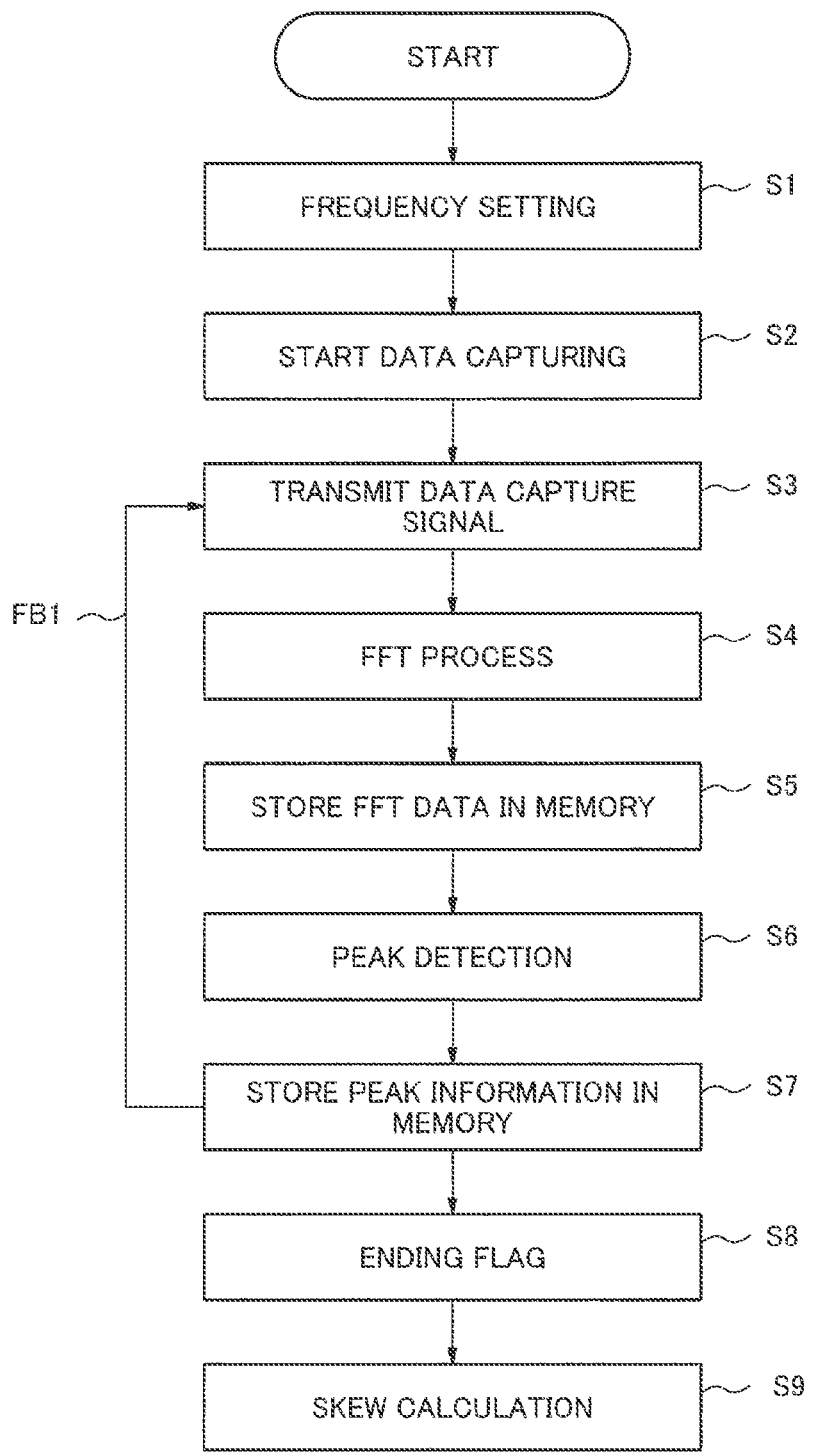
FIG. 6 is a flowchart illustrating another method for detecting interchannel skew in the coherent optical receiver in accordance with the first exemplary embodiment of the present invention.

FIG. 6 shows a flowchart of the method for detecting inter-channel skew for this case. First, a frequency of the test light source 170 is set at a frequency $f_{S1}$ (its wavelength is equal to $\lambda_{S1}$) (step S1). Accordingly, the beat signal of the frequency $f_{IF}=|f_{S1}-f_O|$ is outputted from each output port of the 90-degree hybrid circuit (90° HYBRID) 120.

Next, data capturing process is started (step S2). At that time, the control unit 181 in the control block 180 transmits a data capture signal to the digital signal processing unit (DSP) 150 (step S3). The FFT operation unit 154 receives the data capture signal, triggered by the signal, it performs an FFT process on the data stored in the buffer units (BUF) 153 at that time (step S4), and returns FFT data $I\hat{}_x(N)$, $Q\hat{}_x(N)$, $I\hat{}_y(N)$, and $Q\hat{}_y(N)$ to the control unit 181. The control unit 181 stores the acquired FFT data in the memory unit 182 (step S5).

By an instruction from the control unit 181, the peak detection unit 184 in the operational processing unit 183 extracts the data $I\hat{}_x(N_{max})$ having the maximum magnitude from 4096 points of the FFT data $I\hat{}_x(N)$. The frequency (peak frequency) $f_{max}$ and the phase (peak phase) $\phi_{max}$ at that point are derived by calculation (step S6). The control unit 181 stores this peak frequency and this peak phase in the memory unit 182 as a frequency $f_{IX(l)}$ and a phase $\phi_{IX(l)}$ (step S7).

In order to reduce the influence of a measurement error, the processes from step 3 to step 7 are repeated n times, and frequencies $f_{IX(n)}$ and phases $\phi_{IX(n)}$ are stored in the memory unit 182, respectively (feedback loop FB1). When the n-th loop has been completed, an ending flag is set (step 8).

When detecting the ending flag, by an instruction from the control unit 181, the skew calculation unit 185 in the operational processing unit 183 calculates skews (step S9). For example, phase differences of the $Q_X$, $I_Y$, and $Q_Y$ ports are obtained using the $I_X$ port as a reference for number of measurements n respectively, as follows.

$$\phi_{IX(n)} = 0$$

$$\phi_{QX(n)} - \phi_{IX(n)}$$

$$\phi_{IY(n)} - \phi_{IX(n)}$$

$$\phi_{QY(n)} - \phi_{IX(n)}$$

Figure 7:
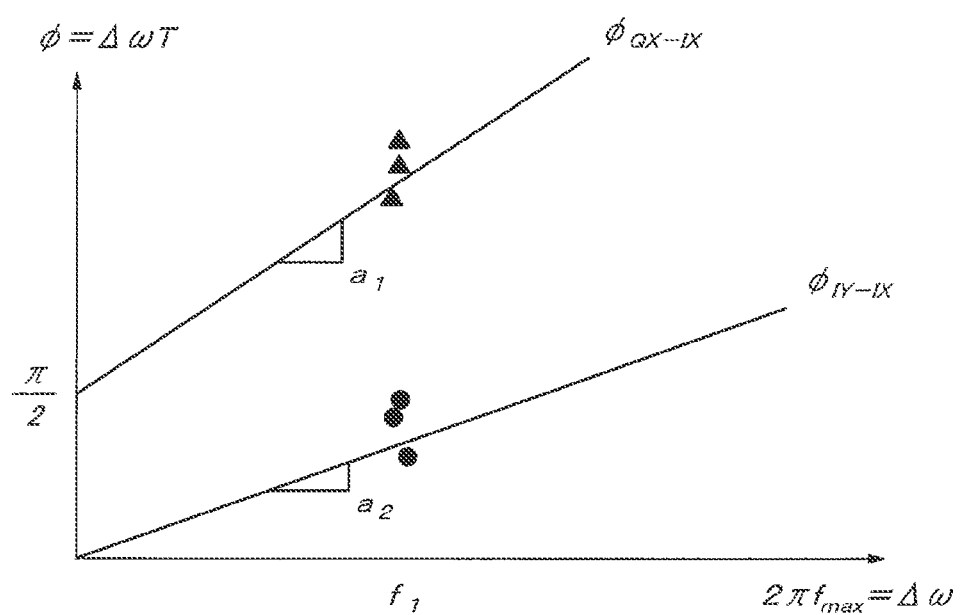
FIG. 7 is a diagrammatic illustration plotting another set of the relations between phase difference and angular frequency at $Q_X$ port and $I_Y$ port of the coherent optical receiver in accordance with the first exemplary embodiment of the present invention.

FIG. 7 shows a diagrammatic illustration plotting the relations between each phase difference of $\phi_{QX-IX}$ and $\phi_{IY-IX}$ in the $Q_X$ port and $I_Y$ port using the $I_X$ port as a reference and the angular frequency $2\pi f_{max}$. Here, if a 90-degree error between the I port and the Q port can be neglected, approximation formulae represented by linear functions are derived for the $Q_X$ port and $I_Y$ port respectively, as follows.

$$\phi_{QX-IX} = a_1(2\pi f) + \pi/2$$

$$\phi_{IY-IX} = a_2(2\pi f)$$

An approximation formula can be similarly derived for the $Q_Y$ port as follows.

$$\phi_{QY-IX} = a_3(2\pi f)$$

Each gradient of $a_1$, $a_2$, and $a_3$ obtained here represents a skew against the $I_X$ port.

In this way, if a 90-degree error can be neglected, an interchannel skew can be detected more simply.

[The Second Exemplary Embodiment]

Figure 8:
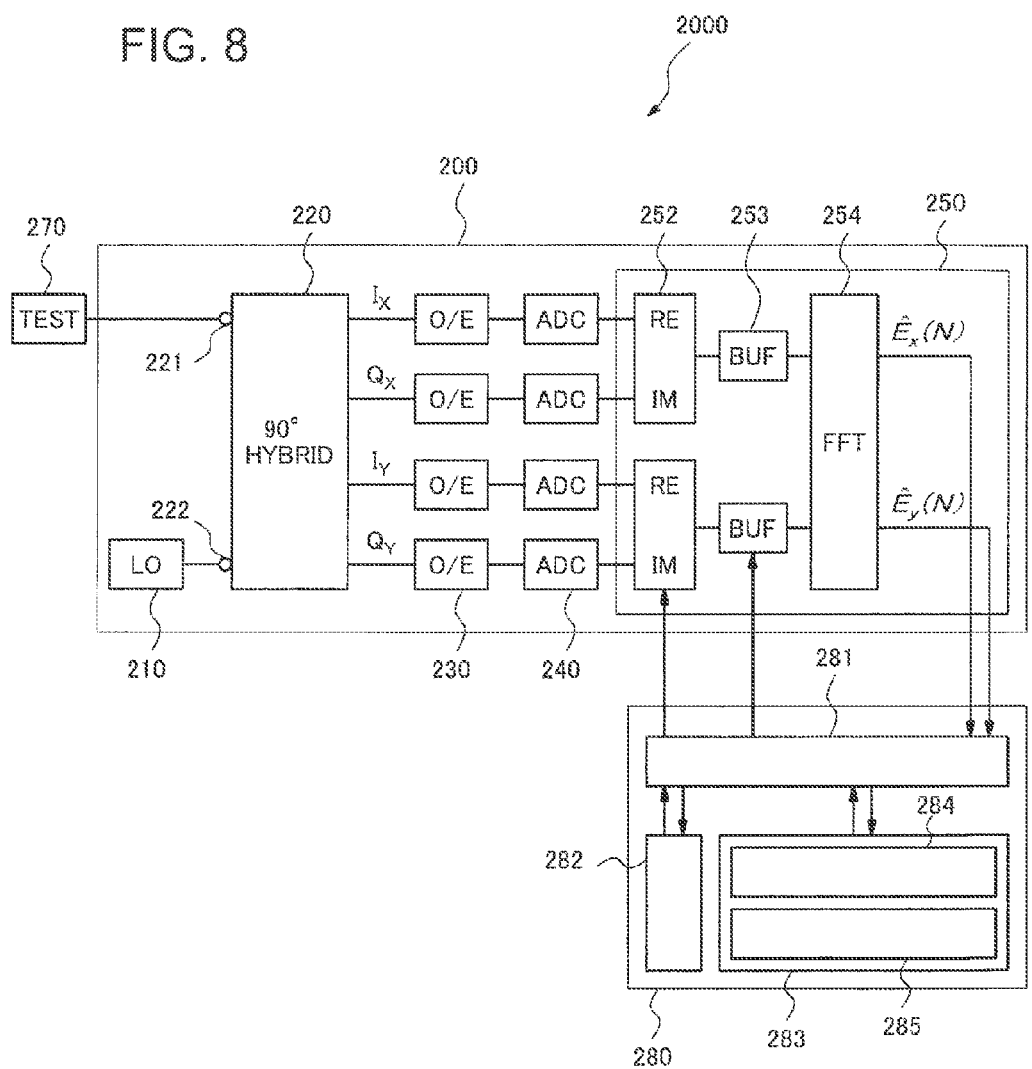
FIG. 8 is a block diagram showing the configuration of an apparatus for detecting interchannel skew in the coherent optical receiver in accordance with the second exemplary embodiment of the present invention.

Next, the second exemplary embodiment of the present invention will be described. FIG. 8 is a block diagram showing the configuration of an apparatus for detecting interchannel skew in the coherent optical receiver 2000 in accordance with the second exemplary embodiment of the present invention. The apparatus for detecting interchannel skew in the coherent optical receiver 2000 includes a coherent optical receiver 200, a test light source 270, and a control block 280 connected to the coherent optical receiver 200.

The coherent optical receiver 200 has a local light source 210, a 90-degree hybrid circuit (90° HYBRID) 220, optoelectronic converters (O/E) 230, analog to digital converters (ADC) 240, and a digital signal processing unit (DSP) 250. The control block 280 includes a control unit 281, a memory unit 282, and an operational processing unit 283, and the operational processing unit 283 is provided with a peak detection unit 284 and a skew calculation unit 285.

In the coherent optical receiver 200 of the present exemplary embodiment, the configuration of the digital signal processing unit (DSP) 250 is different from that of the digital signal processing unit (DSP) 150 in accordance with the first exemplary embodiment. The digital signal processing unit (DSP) 250 is provided with a complex signal generator 252, buffer units (BUF) 253, and an FFT operation unit (FFT) 254.

The test light source (TEST) 270 is connected to a signal port 221 of the 90-degree hybrid circuit (90° HYBRID) 220, and the local light source 210 is connected to a local port 222. Light components outputted from the $I_X$, $Q_X$, $I_Y$, and $Q_Y$ ports, which are output ports of the 90-degree hybrid circuit (90° HYBRID) 220, are inputted into the optoelectronic converters (O/E) 230, respectively.

In detecting interchannel skew in the coherent optical receiver 200, first, a continuous wave (CW) light as a test light of a frequency $f_S$ (its wavelength is equal to $\lambda_S$) is inputted from the test light source 270 into the signal port 221. Here, a wavelength tunable light source can be used for the test light source 270. On the other hand, a CW light as a local light of a frequency $f_O$ (its wavelength is equal to $\lambda_O$) is inputted from the local light source 210 into the local port 222. The test light of frequency $f_S$ and the local light of frequency $f_O$ interfere in the 90-degree hybrid circuit 220, and beat signals of a frequency $f_{IF} = |f_S - f_O|$ are outputted. Here, the beat signals outputted from the $I_X$, $Q_X$, $I_Y$, and $Q_Y$ ports are represented by the above-mentioned formulae from (7) to (10) as is the case in the first exemplary embodiment.

These beat signals are converted into electrical signals by the optoelectronic converters (O/E) 230, quantized by the analog-to-digital converters (ADC) 240, and then inputted into the digital signal processing unit (DSP) 250, respectively. In the digital signal processing unit (DSP) 250, the signals from the I port and the Q port are synthesized, and then processed as complex signals. That is, the complex signal generator 252 receives $I_x$ and $Q_x$, and outputs a complex signal of $E_x = I_x + jQ_x$. Similarly, it receives $I_y$ and $Q_y$ and outputs a complex signal of $E_y = I_y + jQ_y$.

These complex signals $E_x$ and $E_y$ are divided into blocks with respect to each predetermined processing unit (4096 bits, for example) by buffer units 253, and subjected to an FFT process in the FFT operation unit (FFT) 254. As a result, each of matrices $\hat{E}_x(N)$ and $\hat{E}_y(N)$ is obtained as each output of the FFT operation unit 254. Here, "N" represents a point number of FFT and it is equal to a value from 0 to 4095, for example.

In this case, $\hat{E}_x(N)$ is represented by the following formulae.

$$\cos[\Delta\omega(t - T_1)] + j\sin[\Delta\omega(t - T_2)] = \frac{1}{2}(e^{j\Delta\omega(t-T_1)} + e^{-j\Delta\omega(t-T_1)}) +$$
$$\frac{1}{2}(e^{j\Delta\omega(t-T_2)} - e^{-j\Delta\omega(t-T_2)})$$
$$= \frac{1}{2}\{e^{j\Delta\omega t}(e^{-j\Delta\omega T_1} + e^{-j\Delta\omega T_2}) +$$
$$e^{-j\Delta\omega t} + (e^{j\Delta\omega T_1} - e^{j\Delta\omega T_2})\}$$
$$= \frac{1}{2}\{e^{j\Delta\omega t}P_1 + e^{-j\Delta\omega t}P_2\}$$

where $P_1$, $P_2$, and $\Delta\omega$ are represented by the following formulae.

$$P_1 = e^{-j\Delta\omega T_1} + e^{-j\Delta\omega T_2}$$

$$P_2 = e^{j\Delta\omega T_1} - e^{j\Delta\omega T_2}$$

$$\Delta\omega = 2\pi f_{IF}$$

Next, the method for detecting interchannel skew in the coherent optical receiver in accordance with the present exemplary embodiment will be described. The flow of its process is similar to that in the first exemplary embodiment, and therefore the following description will be given also referring to the flowchart shown in FIG. 3. First, a frequency of the test light source 270 is set at a frequency $f_{S1}$ (its wavelength is equal to $\lambda_{S1}$) (step S1). Accordingly, a beat signal of a frequency $f_{IF}=|f_{S1}-f_O|$ is outputted from each output port of the 90-degree hybrid circuit (90° HYBRID) 220.

Next, data capturing process is started (step S2). At that time, the control unit 281 in the control block 280 transmits a data capture signal to the digital signal processing unit (DSP) 250 (step S3). The FFT operation unit 254 receives the data capture signal, triggered by the signal, it performs an FFT process on the data stored in the buffer units (BUF) 253 at that time, and returns FFT data $\hat{E}_x(N)$ and $\hat{E}_y(N)$ to the control unit 281 (step S4). The control unit 281 stores the acquired FFT data in the memory unit 282 (step S5).

Figure 9:
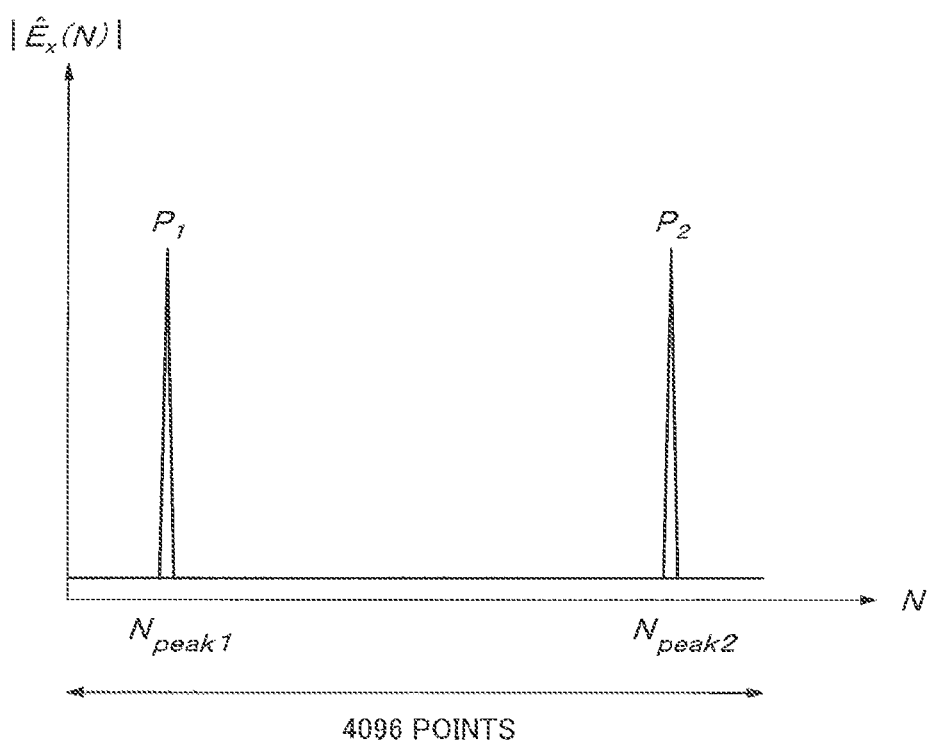
FIG. 9 is a diagrammatic illustration where FFT data are plotted against point number, which are derived by an FFT operation unit in the coherent optical receiver in accordance with the second exemplary embodiment of the present invention.

By an instruction from the control unit 281, the peak detection unit 284 in the operational processing unit 283 extracts two peak values of $P_1=\hat{E}_x(N_{peak1})$ and $P_2=\hat{E}_x(N_{peak2})$ from 4096 points of the FFT data $\hat{E}_x(N)$. And then, the frequencies of $\pm 2\pi f_{IF}$ at that point are derived by calculation (step S6). In FIG. 9, a diagrammatic illustration is shown where $\hat{E}_x(N)$ are plotted against point number N. Here, since the FFT data $\hat{E}_x(N)$ are composed of complex numbers, the vertical axis of the figure represents the magnitude of $\hat{E}_x(N)$, $\hat{E}_x(N)$, and the horizontal axis represents the point number N in the FFT data. As shown in FIG. 9, if $\hat{E}_x(N)$ has peak values at the point numbers $N_{peak1}$ and $N_{peak2}$, the peak detection unit 284 detects $P_1$ and $P_2$. Here, $f_T$ representing a sampling frequency in the analog-to-digital converter (ADC) 240, a frequency interval of the FFT process is equal to $f_T/4096$. Therefore, the peak frequencies at the peaks of $\hat{E}_x(N)$ are equal to $f_{peak1}=N_{peak1} f_T/4096$ and $f_{peak2}=-(4096\ N_{peak2}) f_T/4096$, respectively.

Next, phase information of $\phi_{IX}$ and $\phi_{QX}$ are derived by calculation. First, the peak value $P_1$ is given by the following formula.

$$P_1 = e^{-j\Delta\omega T_1} + e^{-j\Delta\omega T_2}$$
$$= (\cos\Delta\omega T_1 + \cos\Delta\omega T_2) + j(-\sin\Delta\omega T_1 - \sin\Delta\omega T_2)$$
$$= R_1 + jI_1$$

where $R_1$ and $I_1$ are represented by the following formulae.

$R_1 = \cos\Delta\omega T_1 + \cos\Delta\omega T_2$ $I_1 = -\sin\Delta\omega T_1 - \sin\Delta\omega T_2$ Further, the peak value $P_2$ is given by the following formula.

$$P_2 = e^{-j\Delta\omega T_1} - e^{-j\Delta\omega T_2}$$
$$= (\cos\Delta\omega T_1 - \cos\Delta\omega T_2) + j(-\sin\Delta\omega T_1 + \sin\Delta\omega T_2)$$
$$= R_2 + jI_2$$

where $R_2$ and $I_2$ are represented by the following formulae.

$R_2 = \cos\Delta\omega T_1 - \cos\Delta\omega T_2$ $I_2 = -\sin\Delta\omega T_1 + \sin\Delta\omega T_2$ By those formulae mentioned above, the following relational expressions are obtained.

$R_1 + R_2 = 2\cos\Delta\omega T_1$ $R_1 - R_2 = 2\cos\Delta\omega T_2$ $I_1 + I_2 = -2\sin\Delta\omega T_1$ $I_1 - I_2 = -2\sin\Delta\omega T_2$ By solving these relational expressions, the phase information of $\phi_{IX}$ and $\phi_{QX}$ are obtained respectively, as follows.

$$\phi_{IX} = \Delta\omega T_1$$
$$= \tan^{-1}\left(\frac{-(I_1+I_2)}{R_1+R_2}\right)$$

$$\phi_{QX} = \Delta\omega T_2$$
$$= \tan^{-1}\left(\frac{-(I_1-I_2)}{R_1-R_2}\right)$$

In this way, the peak detection unit 284 derives the frequency $f_{peak1}$ and the peak phases $\phi_{IX}$ and $\phi_{QX}$ at the peak of the magnitude of the FFT data $\hat{E}_x(N)$, and the control unit 281 stores them in the memory unit 282 as a frequency $f_{X(1,1)}$, and phases $\phi_{IX(1,1)}$ and $\phi_{QX(1,1)}$, respectively (step S7). At that time, the other data of the FFT data $\hat{E}_x(N)$ can be eliminated.

In order to reduce the influence of a measurement error, the processes from step 3 to step 7 are repeated n times, and frequencies $f_{X(1,n)}$, and phases $\phi_{IX(1,n)}$ and $\phi_{QX(1,n)}$ are stored in the memory unit 282, respectively (feedback loop FB1). When the n-th loop has been completed, an ending flag is set (step S8).

Next, after changing a frequency of the test light source 270 into a frequency $f_{S2}$ (step S9), the processes from step 2 to step 8 are repeated again, and then frequencies $f_{X(2,n)}$ and phases $\phi_{IX(2,n)}$ and $\phi_{QX(2,n)}$ are stored in the memory unit 282 (step S7). When detecting an ending flag (step S8), a frequency of the test light source 270 is further swept (step S9), and then the processes from step 2 to step 8 are repeated again (feedback loop FB2). By repeating the feedback loop FB2 m times, frequencies $f_{X(m,n)}$ and phases $\phi_{IX(m,n)}$ and $\phi_{QX(m,n)}$ are stored in the memory unit 282, respectively. By performing similar processes for $\hat{E}_y(N)$, frequencies $f_{Y(m,n)}$ and phases $\phi_{IY(m,n)}$ and $\phi_{QY(m,n)}$ are stored in the memory unit 282, respectively.

When the above-mentioned processes have been completed, by an instruction from the control unit 281, the skew calculation unit 285 in the operational processing unit 283 calculates skews by a similar method to that in the first exemplary embodiment (step 10).

As mentioned above, according to the apparatus and the method for detecting interchannel skew in the coherent optical receiver of this exemplary embodiment, it becomes possible to calculate skews between the output ports and 90-degree errors between I port and Q port. Moreover, by compensating the skew values obtained above in the skew compensation unit of the digital signal processing unit, with which the coherent optical receiver in accordance with the first exemplary embodiment is provided, it becomes possible to demodulate signals sufficiently even though there arises a skew between the channels, and suppress the degradation of receiving performance.

[The Third Exemplary Embodiment]

Figure 10:
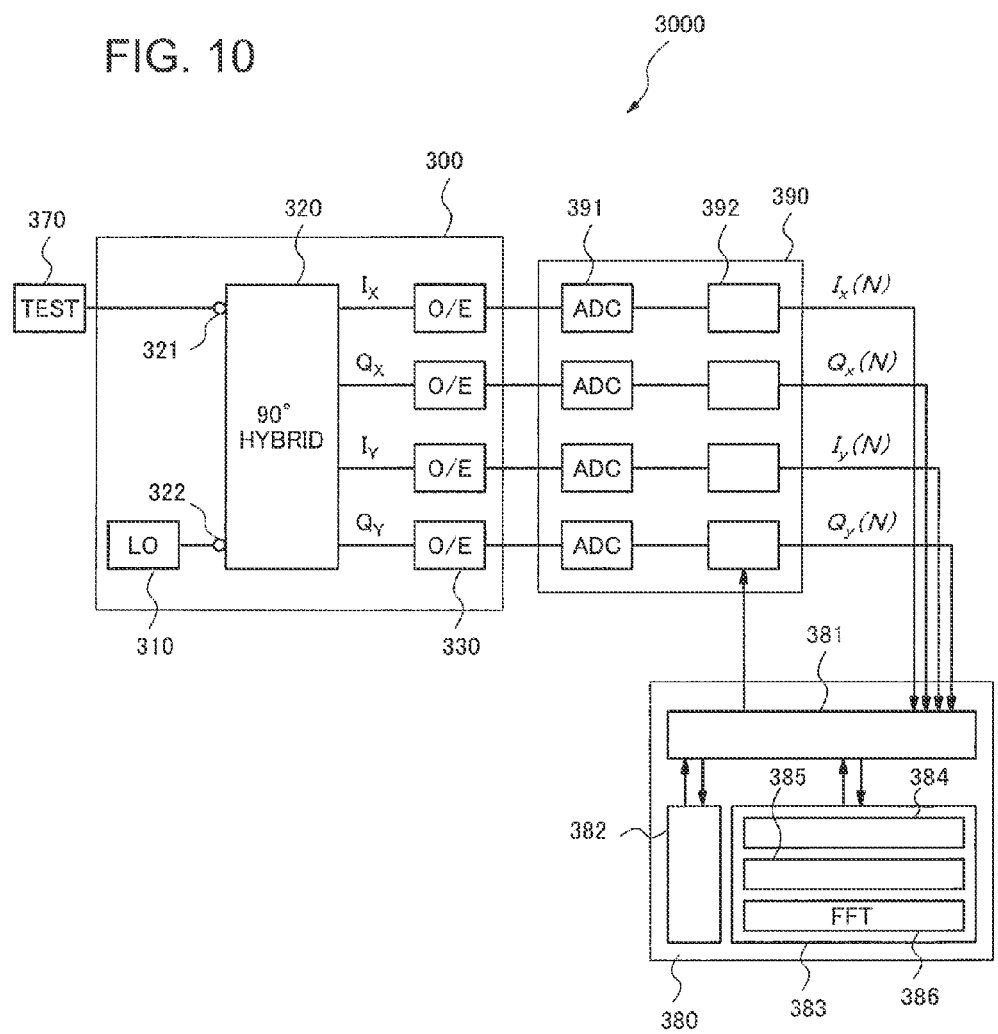
FIG. 10 is a block diagram showing the configuration of an apparatus for detecting interchannel skew in the coherent optical receiver in accordance with the third exemplary embodiment of the present invention.

Next, the third exemplary embodiment of the present invention will be described. FIG. 10 is a block diagram showing the configuration of an apparatus for detecting interchannel skew in the coherent optical receiver 3000 in accordance with the third exemplary embodiment of the present invention. The apparatus for detecting interchannel skew in the coherent optical receiver 3000 has a coherent optical receiver 300, a test light source 370, a control block 380, and a sampling oscilloscope 390 which are connected to the coherent optical receiver 300.

The coherent optical receiver 300 includes a local light source 310, a 90-degree hybrid circuit (90° HYBRID) 320, and optoelectronic converters (O/E) 330. The control block 380 includes a control unit 381, a memory unit 382, and an operational processing unit 383, and the operational processing unit 383 is provided with a peak detection unit 384, a skew calculation unit 385, and an FFT operation unit (FFT) 386.

In the present exemplary embodiment, the configuration is different from each of the first and the second exemplary embodiments in that it includes the sampling oscilloscope 390 instead of the digital signal processing unit (DSP) and the control block 380 is provided with the FFT operation unit (FFT) 386. The sampling oscilloscope 390 is provided with four-channel analog-to-digital converters (ADC) 391 and memory units 392.

The test light source (TEST) 370 is connected to a signal port 321 of the 90-degree hybrid circuit (90° HYBRID) 320, and the local light source 310 is connected to a local port 322. The beat signals outputted from the output ports of the 90-degree hybrid circuit (90° HYBRID) 320, that is, $I_X$ port, Qx port, $I_Y$ port, and $Q_Y$ port, are represented by the above-mentioned formulae from (7) to (10) as is the case in the first exemplary embodiment.

These beat signals are converted into electrical signals by the optoelectronic converters (O/E) 330, quantized by the analog-to-digital converters (ADC) 391 in the sampling oscilloscope 390, and then waveform data of $I_x(N)$, $Q_x(N)$, $I_y(N)$, and $Q_y(N)$ are stored in the memory unit 392. Here, "N" represents the number of the data and takes the values from 0 to 4095, for example.

Figure 11:
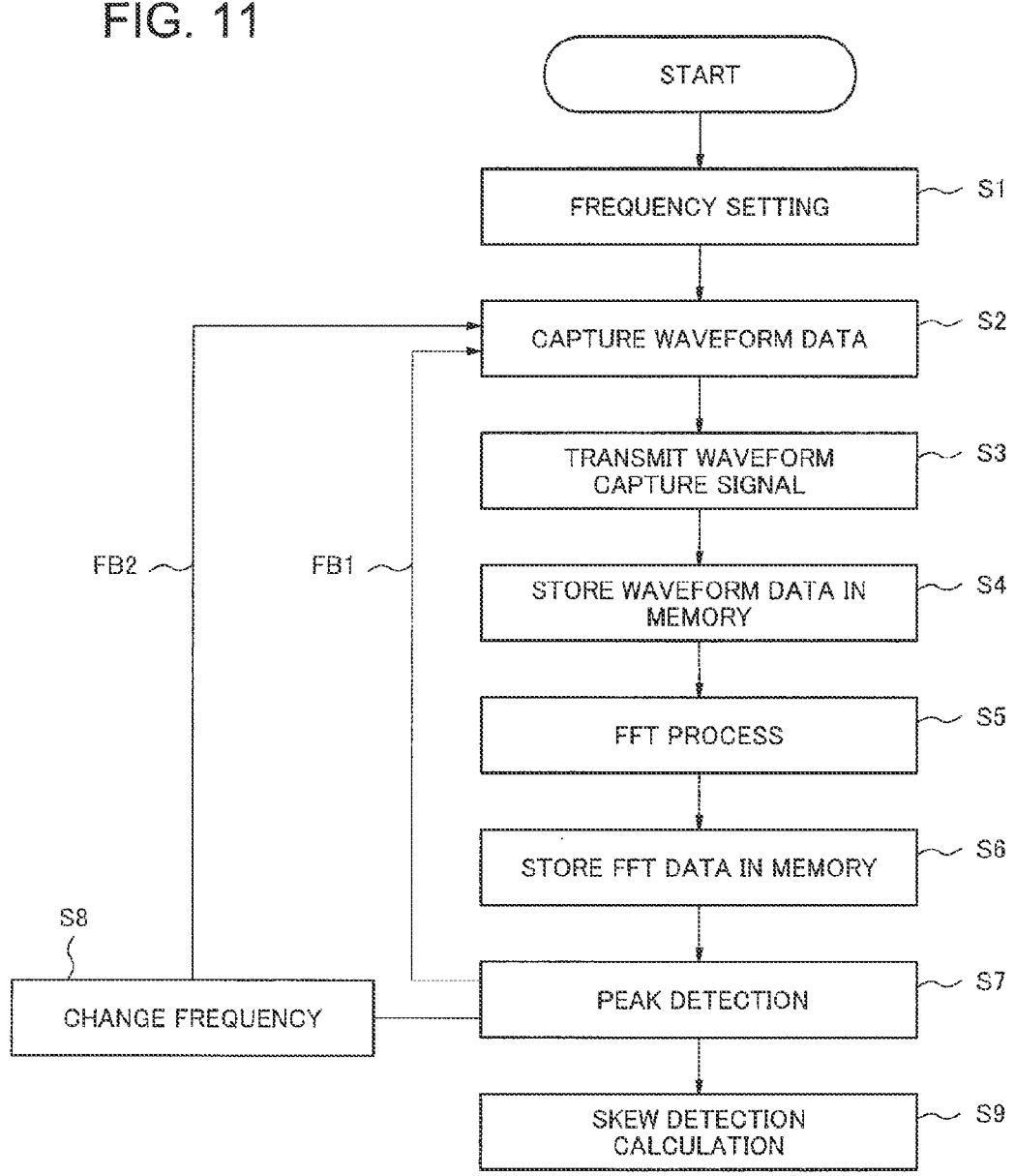
FIG. 11 is a flowchart illustrating a method for detecting interchannel skew in the coherent optical receiver in accordance with the third exemplary embodiment of the present invention.

Next, referring to a flowchart shown in FIG. 11, the method for detecting interchannel skew in the coherent optical receiver in accordance with the present exemplary embodiment will be described. First, the frequency of the test light source 370 is set at a frequency $f_{S1}$ (its wavelength is equal to $\lambda_{S1}$) (step S1). Accordingly, a beat signal of a frequency $f_{IF}=|f_{S1}-f_O|$ is outputted from each output port of the 90-degree hybrid circuit (90° HYBRID) 320.

Next, waveform data is captured in the sampling oscilloscope 390 (step S2). At that time, the control unit 381 in the control block 380 transmits a waveform capture signal to the sampling oscilloscope 390 (step S3). And then, the waveform data stored at that time in the memory unit 392 in the sampling oscilloscope 390 are stored in the memory unit 382 in the control block 380 (step S4).

The FFT operation unit (FFT) 386 in the control block 380 performs an FFT process on waveform data $I_x(N)$, $Q_x(N)$, $I_y(N)$, and $Q_y(N)$ stored in the memory unit 382 (step S5). And then, it returns the processed results of FFT data $\hat{I}_x(N)$, $\hat{Q}_x(N)$, $\hat{I}_y(N)$, and $\hat{Q}_y(N)$ to the control unit 381. The control unit 381 stores the acquired FFT data in the memory unit 382 (step S6).

By an instruction from the control unit 381, the peak detection unit 384 in the operational processing unit 383 extracts the data $\hat{I}_x(N_{max})$ having the maximum magnitude from 4096 points of the FFT data $\hat{I}_x(N)$. Then, the frequency $f_{max}$ and the phase $\phi_{max}$ at that point are derived by calculation (step S7).

In order to reduce the influence of a measurement error, the processes from step 2 to step 7 are repeated n times, and frequencies $f_{IX(1,n)}$ and phases $\phi_{IX(1,n)}$ are stored in the memory unit 382, respectively (feedback loop FB1). When the n-th loop has been completed, the frequency of the test light source 370 is changed into a frequency $f_{S2}$ (step S8), the processes from step 2 to step 7 are repeated again, and then frequencies $f_{IX(2,n)}$ and phases $\phi_{IX(2,n)}$ are stored in the memory unit 382 (feedback loop FB2). By further sweeping the frequency of the test light source 370 and repeating the feedback loop FB2 m times, frequencies $f_{IX(m,n)}$ and phases $\phi_{IX(m,n)}$ are stored in the memory unit 382, respectively. By performing similar processes for $\hat{Q}_x(N)$, $\hat{I}_y(N)$, and $\hat{Q}_y(N)$, frequencies $f_{QX(m,n)}$, $f_{IY(m,n)}$, $f_{QY(m,n)}$, and phases $\phi_{QX(m,n)}$, $\phi_{IY(m,n)}$, and $\phi_{QY(m,n)}$ are stored in the memory unit 382, respectively.

When the above-mentioned processes have been completed, by an instruction from the control unit 381, the skew calculation unit 385 in the operational processing unit 383 calculates skews by a similar method to that in the first exemplary embodiment (step S9).

As mentioned above, according to the apparatus and the method for detecting interchannel skew in the coherent optical receiver of this exemplary embodiment, it becomes possible to calculate skews between the output ports and 90-degree errors between I port and Q port. Moreover, by compensating the skew values obtained above in the skew compensation unit of the digital signal processing unit, with which the coherent optical receiver in accordance with the first exemplary embodiment is provided, it becomes possible to demodulate signals sufficiently even though there arises a skew between the channels, and suppress the degradation of receiving performance.

In the above-mentioned exemplary embodiments, the coherent optical receiver is provided with the polarization diversity type of 90-degree hybrid circuit. However, the 90-degree hybrid circuit is not limited to that, a single polarization type of 90-degree hybrid circuit or its combination can be used.

In addition, although the test light source is connected to the signal port of the 90-degree hybrid circuit and sweeps frequencies in the above-mentioned exemplary embodiments, but not limited to this, by using a wavelength tunable laser as the local light source, the wavelength of the local light source can be swept with the wavelength of the test light source constant.

In the description above, the "I port" and the "Q port" mean signals outputted from the I port and the Q port, which are physical ports, respectively. However, the "$I_X$ port", "$Q_X$ port", "port $I_Y$ port", and "$Q_Y$ port" in the description about the formulae from (7) to (10) represent physical ports, respectively.

Figure 12:
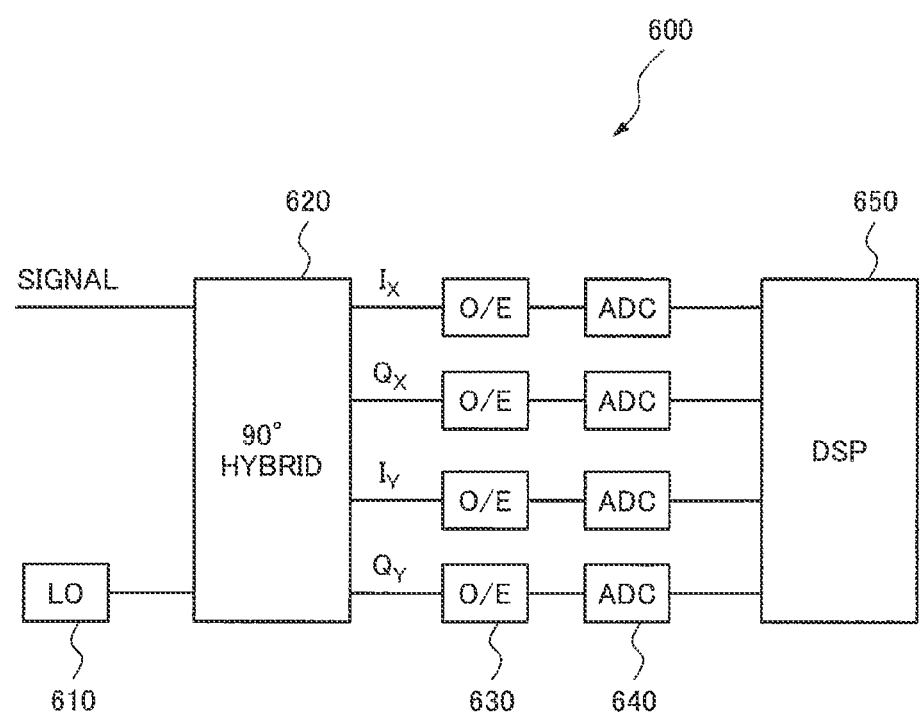
FIG. 12 is a block diagram showing the configuration of a related coherent optical receiver.
Figure 13:
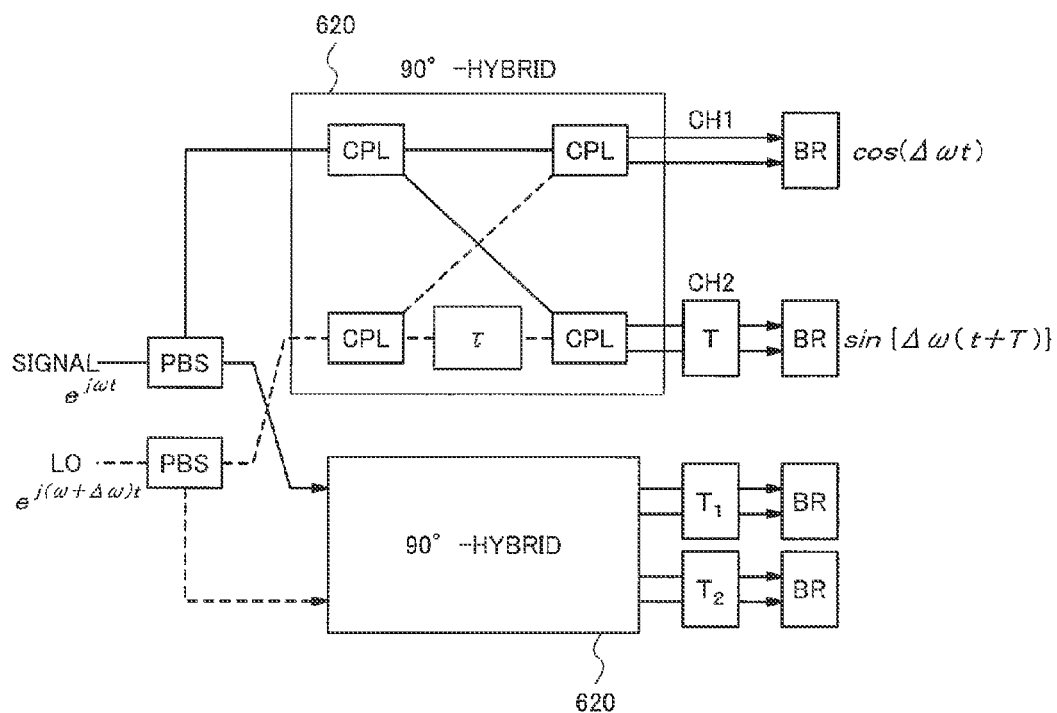
FIG. 13 is a block diagram showing the configuration of related 90-degree hybrid circuits and their peripherals.

In the description about FIG. 12 and FIG. 13, the phrase of "four channels" indicates four signal lines between the outputs of the 90-degree hybrid circuit 620 and the inputs of the analog-to-digital converter 640. And "channel 1 (CH1)" indicates the $I_X$ port, "channel 2 (CH2)" indicates the $Q_X$ port, respectively.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2010-116878, filed on May 21, 2010, the disclosure of which is incorporated herein in its entirety by reference.

DESCRIPTION OF THE CODES 100, 200, 300 coherent optical receiver
110, 210, 310 local light source
120, 220, 320 90-degree hybrid circuit (90° HYBRID)
121, 221, 321 signal port
122, 222, 322 local port
130, 230, 330 optoelectronic converter (O/E)
140, 240 analog-to-digital converter (ADC)
150, 250 digital signal processing unit (DSP)

151 skew compensation unit
152 demodulation unit
153, 253 buffer unit (BUF)
154, 254, 386 FFT operation unit (FFT)
170, 270, 370 test light source
180, 280, 380 control block
181, 281, 381 control unit
182, 282, 382, 392 memory unit
183, 283, 383 operational processing unit
184, 284, 384 peak detection unit
185, 285, 385 skew calculation unit
252 complex signal generator
390 sampling oscilloscope
600 related coherent optical receiver
610 local light source
620 90-degree hybrid circuit (90° HYBRID)
630 optoelectronic converter (O/E)
640 analog-to-digital converter (ADC)
650 digital signal processing unit (DSP)
1000, 2000, 3000 apparatus for detecting interchannel skew in coherent optical receiver

The invention claimed is:

1. A coherent optical receiver, comprising:
a local light source;
a 90-degree hybrid circuit;
an optoelectronic converter;
an analog-to-digital converter; and
a digital signal processing unit,
wherein the 90-degree hybrid circuit makes multiplexed signal light interfere with local light from the local light source, and outputs a plurality of optical signals separated into a plurality of signal components;
the optoelectronic converter detects the optical signals and outputs detected electrical signals;
the analog-to-digital converter quantizes the detected electrical signals and outputs quantized signals; and
the digital signal processing unit comprises an FFT operation unit for performing a fast Fourier transform process on the quantized signals, a skew compensation unit for compensating a difference in propagation delay between the plurality of signal components which is calculated from the results of the fast Fourier transform process, and a demodulation unit for demodulating the quantized signals.

2. The coherent optical receiver according to claim 1, wherein the skew compensation unit compensates the difference in propagation delay which is calculated from a peak frequency and a peak phase at the maximum value in the results of the fast Fourier transform process.

3. An apparatus for detecting interchannel skew in a coherent optical receiver with the coherent optical receiver according to claim 1, comprising:
a test light source; and
a control block;
wherein the 90-degree hybrid circuit makes test light from the test light source interfere with local light from the local light source, and outputs a plurality of optical signals separated into a plurality of signal components;
the control block calculates a difference in propagation delay between the plurality of signal components from the results of the fast Fourier transform process.

4. The apparatus for detecting interchannel skew in a coherent optical receiver according to claim 3,
wherein the control block comprises a peak detection unit and a skew calculation unit;
the peak detection unit calculates a peak frequency and a peak phase at the maximum value in the results of the fast Fourier transform process for each of the plurality of signal components; and
the skew calculation unit calculates the difference in propagation delay from the peak frequency and the peak phase.

5. The apparatus for detecting interchannel skew in a coherent optical receiver according to claim 3,
wherein the control block comprises a peak detection unit and a skew calculation unit;
the FFT operation unit performs a fast Fourier transform process on a signal resulting from synthesizing the quantized signals corresponding to the plurality of signal components;
the peak detection unit detects a plurality of peaks from the results of the fast Fourier transform process, and calculates a peak frequency and a peak phase at each of the plurality of peaks; and
the skew calculation unit calculates the difference in propagation delay from the peak frequency and the peak phase.

6. The apparatus for detecting interchannel skew in a coherent optical receiver according to claim 4,
wherein the skew calculation unit sets the difference in propagation delay equal to a gradient of a linear function, by which a difference between the peak phase corresponding to each of the plurality of signal components is approximated against the peak frequency.

7. The apparatus for detecting interchannel skew in a coherent optical receiver according to claim 5,
wherein the skew calculation unit sets the difference in propagation delay equal to a gradient of a linear function, by which a difference between the peak phase corresponding to each of the plurality of signal components is approximated against the peak frequency.

8. An apparatus for detecting interchannel skew in a coherent optical receiver with the coherent optical receiver according to claim 2, comprising:
a test light source; and
a control block;
wherein the 90-degree hybrid circuit makes test light from the test light source interfere with local light from the local light source, and outputs a plurality of optical signals separated into a plurality of signal components;
the control block calculates a difference in propagation delay between the plurality of signal components from the results of the fast Fourier transform process.

9. The apparatus for detecting interchannel skew in a coherent optical receiver according to claim 8,
wherein the control block comprises a peak detection unit and a skew calculation unit;
the peak detection unit calculates a peak frequency and a peak phase at the maximum value in the results of the fast Fourier transform process for each of the plurality of signal components; and
the skew calculation unit calculates the difference in propagation delay from the peak frequency and the peak phase.

10. The apparatus for detecting interchannel skew in a coherent optical receiver according to claim 8,
wherein the control block comprises a peak detection unit and a skew calculation unit;
the FFT operation unit performs a fast Fourier transform process on a signal resulting from synthesizing the quantized signals corresponding to the plurality of signal components;

the peak detection unit detects a plurality of peaks from the results of the fast Fourier transform process, and calculates a peak frequency and a peak phase at each of the plurality of peaks; and the skew calculation unit calculates the difference in propagation delay from the peak frequency and the peak phase.

11. The apparatus for detecting interchannel skew in a coherent optical receiver according to claim 9, wherein the skew calculation unit sets the difference in propagation delay equal to a gradient of a linear function, by which a difference between the peak phase corresponding to each of the plurality of signal components is approximated against the peak frequency.

12. The apparatus for detecting interchannel skew in a coherent optical receiver according to claim 10, wherein the skew calculation unit sets the difference in propagation delay equal to a gradient of a linear function, by which a difference between the peak phase corresponding to each of the plurality of signal components is approximated against the peak frequency.

13. A method for receiving coherent light, comprising the steps of making multiplexed signal light interfere with local light from a local light source, and outputting a plurality of optical signals separated into a plurality of signal components;

detecting the optical signals and outputting detected electrical signals; quantizing the detected electrical signals and outputting quantized signals; performing a fast Fourier transform process on the quantized signals; and compensating a difference in propagation delay between the plurality of signal components which is calculated from the results of the fast Fourier transform process.

14. The method for receiving coherent light according to claim 13, further comprising:

in the step of compensating the difference in propagation delay, compensating the difference in propagation delay which is calculated from a peak frequency and a peak phase at the maximum value in the results of the fast Fourier transform process.

* * * * *